United States Patent [19]

Kubo

[11] 4,443,661
[45] Apr. 17, 1984

[54] METHOD OF DETECTING TROUBLES IN A RECEIVER FOR A COMMON CONTROL CHANNEL OF A MOBILE RADIO TELEPHONE COMMUNICATION SYSTEM AND A SYSTEM THEREFOR

[75] Inventor: Hiroshi Kubo, Tokyo, Japan

[73] Assignee: Nippon Electric Co., Ltd., Tokyo, Japan

[21] Appl. No.: 313,406

[22] Filed: Oct. 21, 1981

[30] Foreign Application Priority Data

Oct. 31, 1980 [JP] Japan .................................. 55-153436

[51] Int. Cl.³ ......................... H04Q 7/04; H04B 17/00
[52] U.S. Cl. .................................... 179/2 EB; 455/67; 455/33
[58] Field of Search ............... 179/2 E, 2 EB; 455/33, 455/53, 54, 56, 67, 89, 226

[56] References Cited

U.S. PATENT DOCUMENTS

3,970,940 7/1976 Venn ................................ 455/226 X
4,180,708 12/1979 Yamaguchi et al. ............. 179/2 EB

OTHER PUBLICATIONS

Review of the Electrical Communication Laboratories, vol. 25, No. 11-12, Nov.-Dec. 1977, pp. 1231-1244, Sakamoto et al., "Mobile Unit for 800 MHz Band Land Mobile Telephone System".
Review of the Electrical Communication Laboratories, vol. 25, No. 11-12, Nov.-Dec. 1977, pp. 1172-1190, Yoshikawa et al., "800 HMz Band Land Mobile Telephone Control System".
NEC Research & Development, No. 57, Apr. 1980, pp. 99-108, Sado et al., "Supervisory and Control Equipment".

Primary Examiner—G. Z. Rubinson
Assistant Examiner—W. J. Brady
Attorney, Agent, or Firm—Sughrue, Mion, Zinn, Macpeak and Seas

[57] ABSTRACT

A mobile radio system having apparatus for monitoring problems in the access channel receiver of a base station. The output of the access channel receiver of a base station is linked directly, or indirectly via an access channel data receiver in a control center, to a test apparatus. The test apparatus monitors the signals linked thereto and in this manner determines that signals are passing through the access channel receiver. If no signal is received at the test apparatus within a first predetermined time it transmits to the base station a test signal designed to be received by the base station access channel receiver. If the access channel receiver is operating correctly it will receive the test signal and a signal will be linked to the test apparatus. If the access channel receiver is not operating correctly no signal will be linked to the test apparatus, and if the test apparatus does not receive the test signal from the output of the access channel receiver within a second predetermined time after the transmission of the test signal, the test apparatus will provide an output indicating that a problem exists in the access channel receiver.

8 Claims, 10 Drawing Figures

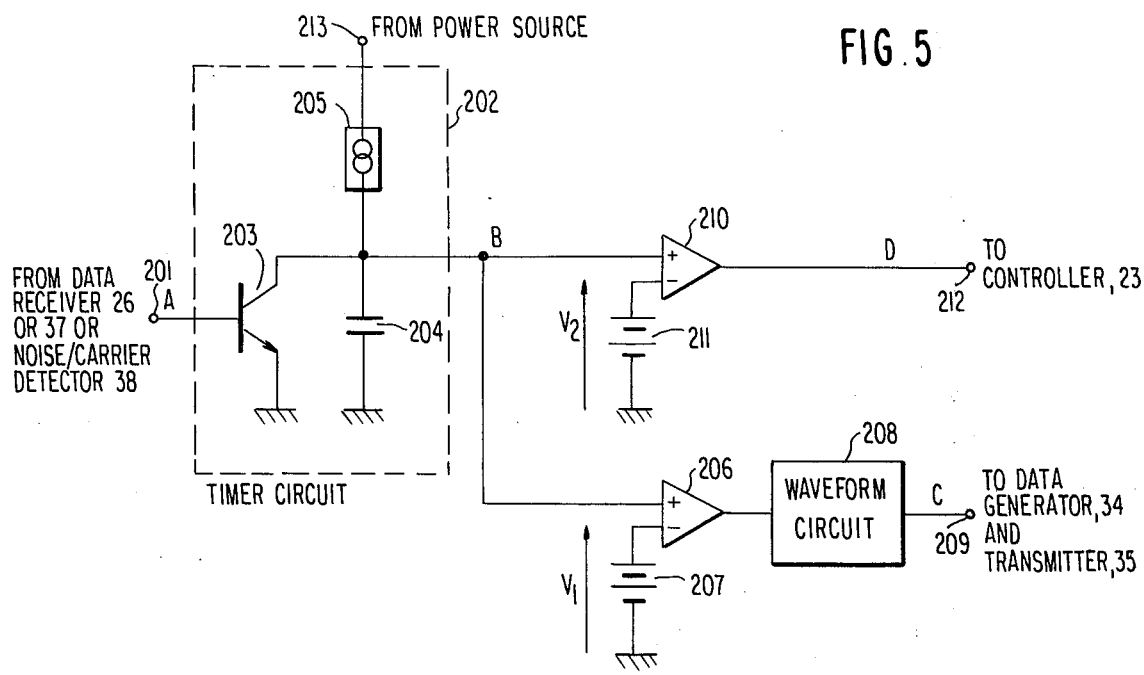
FIG. 5
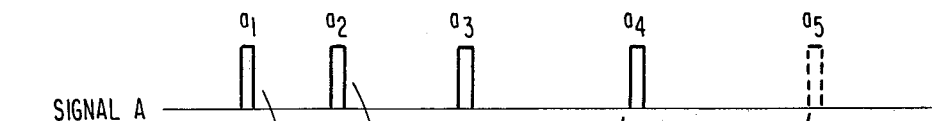
FIG. 6A  SIGNAL A
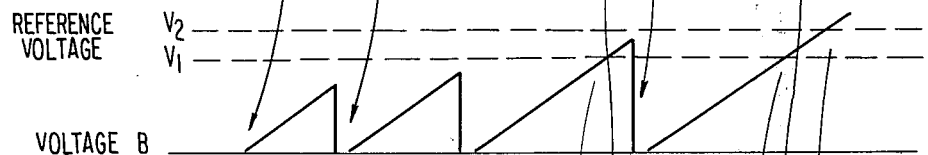
FIG. 6B  VOLTAGE B
FIG. 6C  SIGNAL C
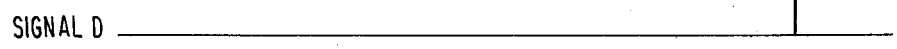
FIG. 6D  SIGNAL D

METHOD OF DETECTING TROUBLES IN A RECEIVER FOR A COMMON CONTROL CHANNEL OF A MOBILE RADIO TELEPHONE COMMUNICATION SYSTEM AND A SYSTEM THEREFOR

BACKGROUND OF THE INVENTION

The present invention relates to a mobile radio telephone communication system having a plurality of speech channels and at least one common control channel, and more particularly to a method of detecting troubles in a receiver for the common control channel thereof.

Currently available mobile systems of radio telephone communication include the so-called cellular system, wherein the service area is divided into a plurality of small zones, a base station being installed in each zone, and communication is achieved between a mobile subscriber station and a fixed subscriber or between mobile subscriber stations over one of plural speech channels assigned to the base station concerned. In this system, there are assigned to each base station for common use by the plurality of mobile stations in the zone covered by the base station, in addition to a plurality of speech channels, a paging channel for controlling incoming calls to the mobile stations and an access channel for controlling outgoing calls therefrom. One example of mobile radio telephone communication system having such a channel arrangement is described in "800 MHz Band Land Mobile Telephone Control System" in "REVIEW OF THE ELECTRICAL COMMUNICATION LABORATORIES", pp. 1172–1190, Vol. 25, Nos. 11–12, published by Nippon Telegraph & Telephone Public Corporation, Nov.–Dec. 1977.

In a mobile radio telephone system for achieving communication over multiple speech channels, it is intended to reduce the time required for making connections and to efficiently use the radio frequencies assigned thereto by the specialized connection control of the paging and access channels. However, because the paging and access channels are commonly used in a given radio zone, in the event of a trouble in the radio transmitter/receivers or on the wire line for the paging and access channels, the mobile stations present in the zone covered by the troubled base station will become unable either to transmit or to receive calls, affecting the functioning of the whole system.

Therefore, any trouble on the wire line or in the radio transmitter/receivers for the paging and access channels has to be quickly detected and made known to the central station controlling the base station. For detecting troubles on the paging and access channel of a base station, it is known to constantly monitor the outputs of the transmitter/receivers, by which trouble detection on paging channel alone can be achieved with comparative ease. This is because on the paging channel a control signal is transmitted from the base station. This system, however, cannot easily detect the trouble on the access channel of the base station. This results from the random transmission of call signals on the access channel from the mobile station. Thus, when there is no output from the access channel receiver, it is impossible to dtermine whether the absence of an output is attributed to a problem on the access channel receiver or to the absence of a call from the mobile station.

There has been developed a system in which a test mobile station is installed in each base station. An operator, by remote control from the central station, actuates each test mobile station to send a test transmission signal in response to a report of trouble from a mobile station subscriber or in accordance with a periodic maintenance program to detect any trouble on the access channel. For further details on such a system, reference is made to "Supervisory and Control Equipment", in "NEC RESEARCH & DEVELOPMENT", No. 57, pp. 99–108, issued by Nippon Electric Co., Ltd., April 1980. Although it is a useful system capable of detecting troubles on the access channel of the base station, it has a disadvantage in that if the intervals of maintenance by the operator are too long, a problem may take a long time to be detected by the operator after it arises or, if maintenance intervals are reduced to quicken trouble detection, the detecting process will hinder communication by other mobile stations sending out ordinary call signals.

SUMMARY OF THE INVENTION

It is therefore an object of the present invention to provide a mobile radio telephone communication system, capable of quickly and automatically detecting a problem on the line involving the access channel without affecting call signals sent out by ordinary mobile stations.

According to the present invention, there is provided a mobile radio telephone system comprising mobile stations; base stations, each base station having a plurality of speech channel transmitter/receivers to transmit and receive signals through a speech channel and an access channel transmitter/receiver to control calls from the mobile stations through an access channel; and a central station for connecting the mobile stations and a telephone exchange network or the mobile stations with each other by way of the base stations, the system further comprising means for detecting from the output of the access channel receiver a calling signal from the mobile station and a test calling signal, and control means connected to the output of the detecting means for transmitting the test calling signal to the last-mentioned access channel receiver if the detection output of the detecting means is not received within a first predetermined interval of time and, for generating a trouble signal if the detection output is not received within a second predetermined interval of time, after the transmission of the test calling signal, the second predetermined interval of time being shorter than the first predetermined interval of time.

Other objects, features and advantages of the present invention will be more apparent from the following detailed description taken in conjunction with the accompanying drawings.

BRIEF DESCRIPTION OF THE DRAWINGS

FIG. 5 is a block diagram illustrating an embodiment of the control section in the mobile test transmitter of FIG. 3; and FIGS. 6A–6D are a time chart for explaining the operation of the embodiment illustrated in FIG. 5.

DESCRIPTION OF THE PREFERRED EMBODIMENTS

Figure 1:
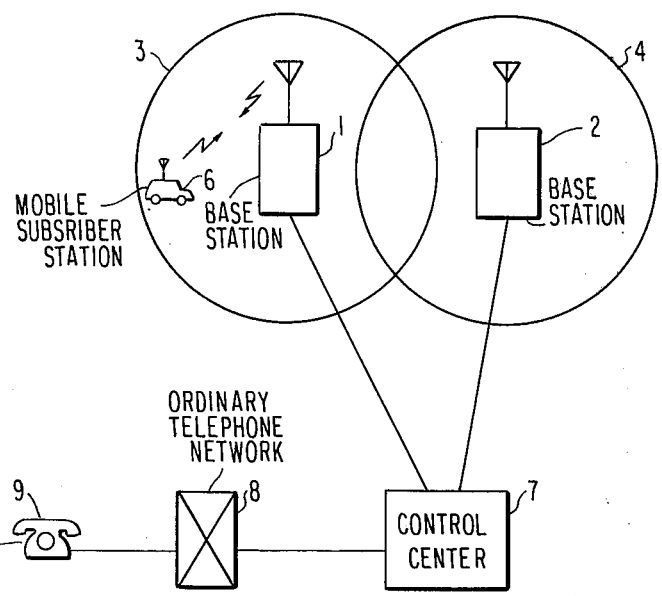
FIG. 1 is a drawing outlining a mobile radio telephone system pertinent to the present invention.

Referring to FIG. 1, base stations 1 and 2 respectively cover the service areas of zones 3 and 4, where their respective radio waves can reach. A mobile subscriber station 6 is in the service area of either one of the base stations 1 and 2, both of which are connected by wire lines to a control center 7 being linked to fixed subscriber telephone sets 9 by way of an ordinary telephone network 8. The control center 7, though illustrated in a geographically separate place from the base stations 1 and 2, can as well be installed in the same office as either one of the two base stations. To each of the base stations 1 and 2 are assigned a paging channel (P-CH), an access channel (A-CH), and a plurality of speech channels (S-CHs). For these channels, as described hereinafter, each base station is equipped with a paging channel, an access channel and speech channel transmitter/receivers. The mobile subscriber station has no transmitter/receiver exclusively used for the paging and access channels, but employs particular transmitter/receiver capable of tuning in these channels by a frequency synthesizer. For further details of this system shown in FIG. 1, reference is made to the above cited literature of NTT.

Figure 2A:
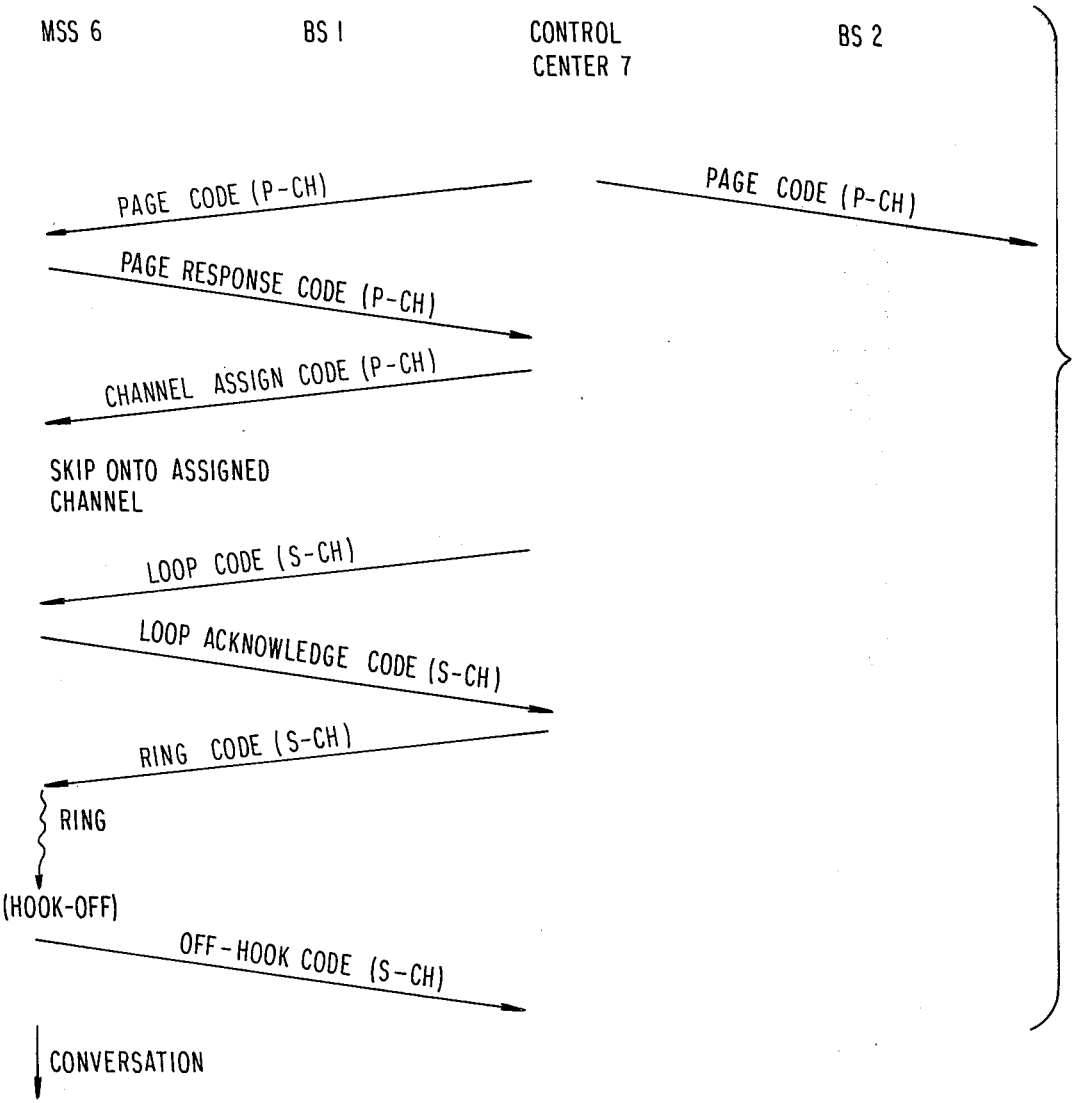
FIGS. 2A and 2B are diagrams for illustrating how a speech channel, a paging channel and an access channel are used in the system shown in FIG. 1.

Usually, the mobile subscriber station 6 is awaiting the arrival of a call to it, with its reception channel tuned to the paging channel. As illustrated in FIG. 2A, when a call to the mobile subscriber station 6 is generated, a page code is sent from the control center 7 to the station 6 over the paging channel through both base stations 1 and 2. In response to this page code, the mobile subscriber station 6 transmits a page response code over the paging channel. When the mobile subscriber station 6 is within the radio zone 3 (FIG. 1), this page response code is sent to the control center 7 via the base station 1. Upon receipt of the page response code from the base station 1, the control center 7 selects an idle channel out of a plurality of speech channels assigned to the base station 1 and sends to the mobile subscriber station 6 a channel assign code which designates the number of that idle channel. In response to this channel assign code, the mobile subscriber station 6 switches its channel to the designated speech channel, and then sends to the control center 7 a loop acknowledge code in reply to the reception of a loop code from the control center 7. After loop acknowledgement by this operation, the control center 7 sends to the mobile subscriber station 6 a ring code, in response to which the mobile subscriber station 6 rings a bell to inform its subscriber of a call addressed thereto. The mobile station subscriber then hooks off its hand set. With this operation, the mobile station sends an off-hook code to the control center 7 which receives it to provide for the start of conversation.

Figure 2B:
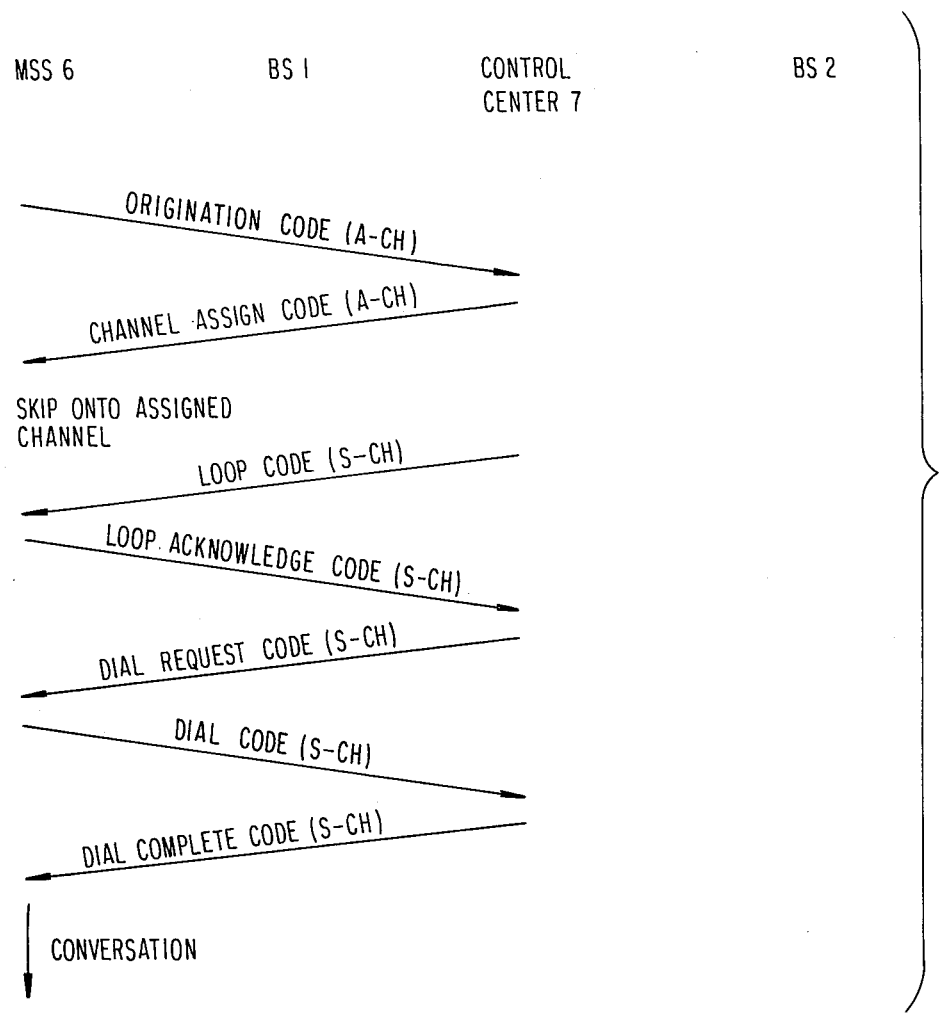

On the other hand, when a call is to be made from the mobile subscriber station 6, a mobile station subscriber picks up its hand set and dials the number of the addressee. With picking-up of the hand set, the mobile station automatically switches over its channel from the paging channel to the access channel, over which an origination code is sent to the control center 7, as shown in FIG. 2B. It is to be noted that information on the mobile station subscriber's actions from off-hook to dialling is stored in the mobile station's buffer memory. Upon receipt of the origination code from the base station 1, the control center 7, as in the foregoing case of paging addressed to the mobile subscriber station 6, sends a channel assign code to the mobile subscriber station 6 over the access channel. When the mobile station switches its channel to the designated speech channel and completes loop acknowledgement, the control center 7 sends a dial request code over the speech channel now linked to the mobile subscriber station 6. The mobile subscriber station 6 sends a dial code to the control center 7 in response to the dial request code. If the control center 7 fully receives this dial code, it will send a dial complete code to the mobile subscriber station 6, at the same time call the party with whom the mobile station subscriber intends to have conversation, and establish a speech channel loop, thereby enabling conversation to be started. For an exemplary composition of the mobile subscriber station 6, reference is made to "Mobile Unit for 800 MHz Band Land Mobile Telephone System" in the same issue of NTT, "REVIEW OF THE ELECTRICAL COMMUNICATION LABORATORIES" as the one cited above, pp. 1231–1244.

Figure 3:
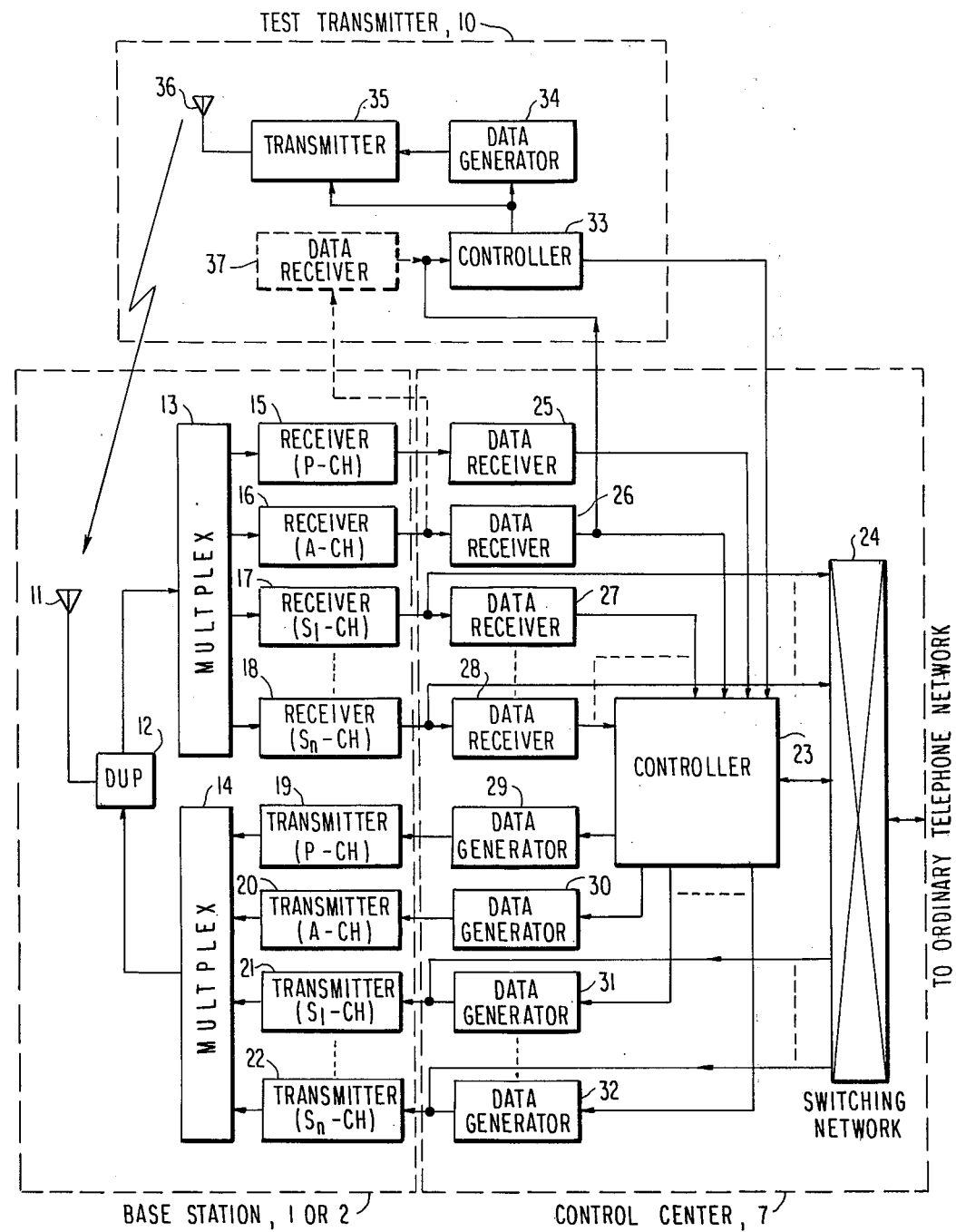
FIG. 3 shows a block diagram of a base station according to the present invention.

In FIG. 3, the base station 1 (or 2) has a transmitter 19, a receiver 15, both for the paging channel, a transmitter 20, a receiver 16, both for the access channel, and transmitters 21–22 and receivers 17–18, all for speech channels ($S_1$-CH-$S_n$-CH), and all these transmitter/receivers are linked to an antenna 11 via multiplexers 13 and 14 and a duplexer 12. The receivers 15–18 are respectively connected to data receivers 25–28 of the control center 7, the transmitters 19–22 respectively to data generators 29–32 of the same, and the receivers 17–18 and transmitters 21–22 to a switching network 24, which is connected to the ordinary telephone network 8 (FIG. 1) and whose switching control is accomplished with a controller 23.

The controller 23, involving a microcomputer, a read-only-memory (ROM), a random access memory (RAM) and so on, is responsible for the connection control explained with reference to FIGS. 1, 2A and 2B. Thus, if there is any call reaching the mobile subscriber station, the controller 23 receives its data from the switching network 24 and gives commands to the data generator 29 for the paging channel to generate a page and a channel assign codes. Also it receives from the designated one of the data receivers 27–28 a loop acknowledge code and an off-hook code sent from the mobile subscriber station over the designated speech channel, activates one of the data generators 31–32, pertinent to the designated channel, to generate a loop code and a ring code, and sends them to the mobile subscriber station. At the same time with the reception of the off-hook code from the mobile subscriber station, the controller 23 so controls the switching network 24 as to connect the receiver 17 or 18 and the transmitter 21 or 22, whichever are pertinent to the designated channel, to the caller's line. A call from the mobile subscriber station is subjected to similar control to have a speech loop formed. Incidentally, it could be readily understood that data signals for use in this system can be either tone signals or digital signals.

Next will be described in detail the operation of detecting trouble in the access channel receiver 16. A call from the mobile subscriber station is received by the receiver 16 via the antenna 11, the duplexer 12 and the multiplexer 13. A signal demodulated by the receiver 16 is detected by the data receiver 26, which consists of a tone detector if data signals are in a tone form, or of a digital pattern detector or the like if they are in a digital form. The signal detected by the data receiver 26 is supplied to both the controller 23 and another controller 33 in a test transmitter 10.

The controller 33 determines whether or not the detection output from the data receiver 26 is entered within a first prescribed time interval. If it is not, the controller 33 actuates a data generator 34 to generate a test origination code, which is sent out by way of a transmitter 35 and an antenna 36. If the test origination code so sent out is received by the receiver 16 and returns to the controller 33 within a second prescribed time interval, the receiver 16 for the access channel is determined to be normally functioning. If it does not so return, a trouble is judged to have arisen in the receiver 16, and the controller 33 supplies the controller 23 of the control center 7 with a signal indicating the trouble.

The foregoing description refers to a case in which the control center 7 and the base station 1 (or 2) are housed in the same office, and the input signal to the test transmitter 10 comes from the data receiver 26 in the control center 7. However, if the control center 7 and the base station 1 (or 2) or geographically apart from each other, this composition can not be used, and in such a case another data receiver 37 to be connected to the access channel receiver 16 has to be provided within the test transmitter 10, as indicated by broken lines in FIG. 3. In this composition, the data receiver 37 can be replaced with a detector capable of detecting the field strength of the carrier or the noise in the out-band of the carrier. (The latter is known as the noise squelch.) In this instance, the data generator 34 for generating the test origination code is not required, and instead it would be sufficient to simply turn on and off, with a control signal from the controller 33, a driver circuit or the like inserted into the output stage of the power amplifier of the transmitter 35.

Figure 4:
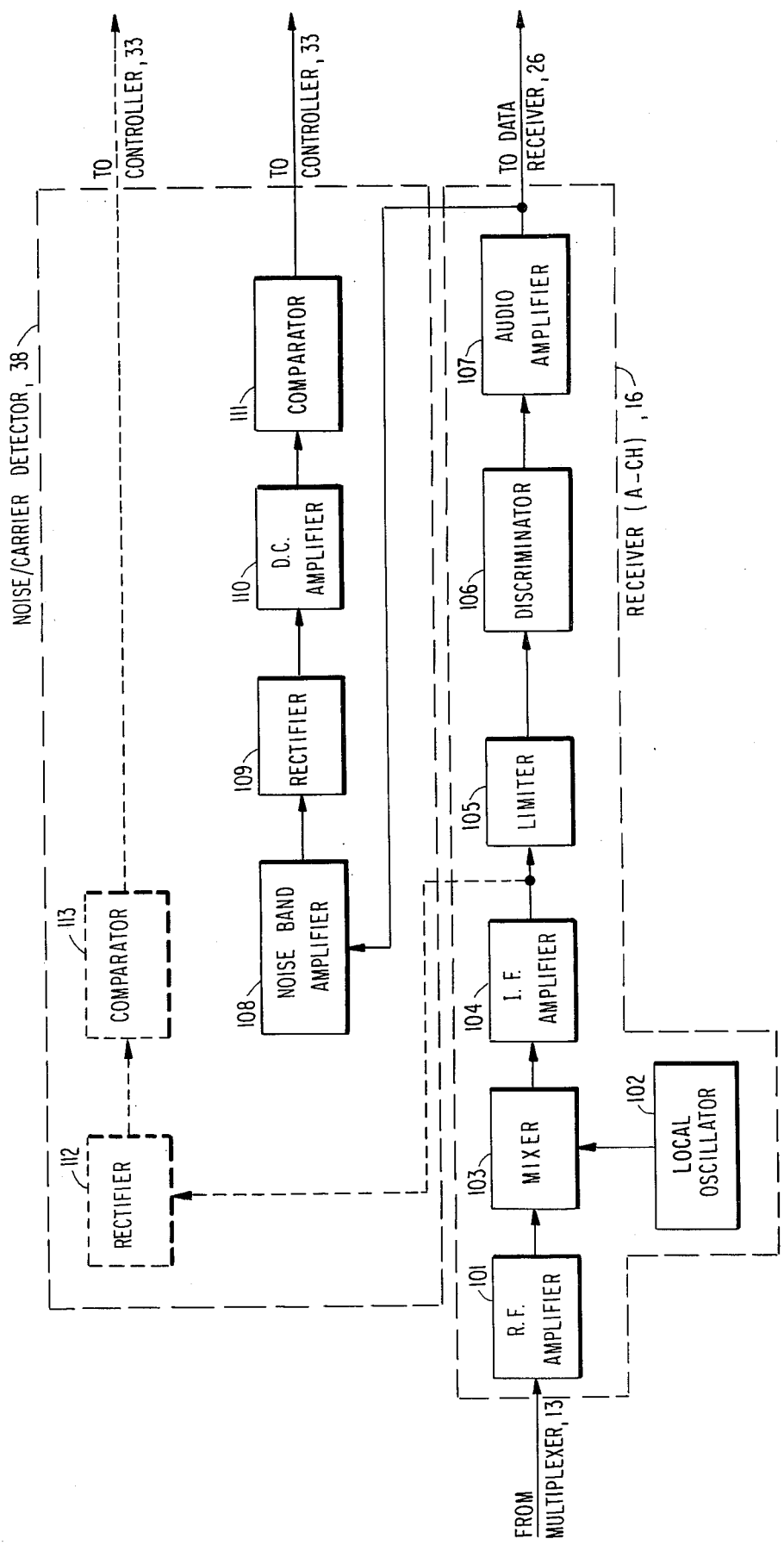
FIG. 4 is a block diagram illustrating one embodiment of a noise/carrier detector according to the present invention.

One example of a detector of the field strength of the carrier or the out-band noise (a noise/carrier detector 38) is illustrated in FIG. 4. First will be described the noise squelch operation. A signal from the multiplexer 13 (FIG. 3), after being amplified by a high-frequency amplifier 101 in the access channel receiver 16, is frequency-mixed with a local oscillation signal from a local oscillator 102 in a mixer 103, and converted into an intermediate frequency band. The frequency-converted signal, after being amplified by an intermediate frequency amplifier 104, is amplitude-limited by a limiter 105 and supplied to a frequency discriminator 106. The signal, having gone through frequency discrimination by the discriminator 106, is amplified by an amplifier 107, and supplied to the data receiver 26 (FIG. 3) and a noise band amplifier 108 in the noise/carrier detector 38. At the noise band amplifier, the noise component in the output of the receiver 16 is amplified and, after passing a rectifier 109 and a direct current (DC) amplifier 110, is compared with a certain threshold value at a comparator 111. Whether or not a calling signal is received is monitored according to the output of the comparator 111, and this output is supplied to the controller 33 (FIG. 3).

When the field strength of the carrier is to be monitored, the output of the intermediate frequency amplifier 104 is supplied to the detector 112, whose output is then led to the comparator 113 for monitoring. Similar to the noise squelch, the output of the comparator 113 is applied to the controller 33.

Referring to FIG. 5, next will be described an embodiment of the controller 33 (FIG. 3) in the test transmitter, with reference to FIGS. 6A-6D. A detection signal, indicating the presence or absence of a calling signal, from the data receiver 26 or 37 (FIG. 3) or the noise/carrier detector 38 (FIG. 4) is fed as an input signal A to an input terminal 201 of a timer circuit 202. When a pulse $a_1$ (FIG. 6A) detected to indicate the presence of the calling signal, is supplied to the input terminal 201, a transistor 203 is turned on, whereby the potential of a capacitor 204, i.e., the output potential B of the timer circuit 202, is reduced to zero. Until the next calling pulse $a_2$ (FIG. 6A) is received, the potential B takes a value proportional to time as shown in FIG. 6B. This is due to the fact that the capacitor 204 is charged by a constant current source 205, which is connected to a power source by way of a terminal 213. If calling signals from the mobile station are transmitted at such time intervals as are represented by pulses $a_1$-$a_3$ in FIG. 6A, the timer circuit 202 repeats the foregoing operations.

If a calling signal from the mobile station does not come for a predetermined time interval determined by the time constant of the timer circuit 202, the potential B will surpass a first reference voltage $V_1$, so that a voltage comparison amplifier 206 generates a high level signal at its output. The reference voltage $V_1$ of the amplifier 206 is provided by a battery 207. The output of the amplifier 206 is fed to a pulse waveform shaping circuit 208, shaped thereby into a driving pulse signal $c_1$ (FIG. 6C) and supplied to the data generator 34 and the transmitter 35 (FIG. 3). In response to this pulse signal $c_1$ the transmitter 35 is actuated, and the test origination code is issued from the data generator 34. In the absence of the data generator 34, obviously, only the carrier is radiated by the transmitter 35.

If the access channel receiver is normally operating when the pulse signal $c_1$ is generated, a pulse signal $a_4$ in FIG. 6A will come back to the input terminal 201 of the timer circuit 202, and the potential B will return to zero as shown in FIG. 6B. On the other hand, if the access channel receiver has any trouble, a pulse signal $a_5$ in FIG. 6A, which indicates reception of a pulse signal $c_2$ in FIG. 6c, will not return to the input terminal 201. As a result, the potential B will continue to rise as shown in FIG. 6B until it surpasses a second reference voltage $V_2$, and a voltage comparison amplifier 210 will generate a trouble signal D (FIG. 6D). The second reference voltage $V_2$ is supplied to the amplifier 210 by a battery 211. The trouble signal D, as stated above, is supplied to the controller 23 of the control center (FIG. 3).

As is obvious from the foregoing description, according to the present invention, a test calling signal is generated and transmitted when no calling signal appears the output of the access channel receiver, and this test calling signal is received by the receiver. Therefore, the present invention allows the access channel receiver to almost instantaneously and automatically detect the occurrence of any trouble without substantially affecting ordinary calls from the mobile station, and can thereby help tremendously improve the reliability and maintenance efficiency of the system.

What is claimed is:
1. In a mobile radio telephone system of the type having mobile stations; base stations, each base station having a plurality of speech channel transmitter/receivers to transmit and receive signals through a speech channel and an access channel transmitter/receiver to control calls from said mobile stations through an access channel; and a central station for connecting said mobile stations and a telephone exchange network or said mobile station with each other by way of said base stations, the improvement comprising:

means for detecting from the output of said access channel receiver a calling signal from said mobile station and a test calling signal and providing a detection output in response to said calling signal and said test calling signal; and control means connected to the output of said detecting means for transmitting said test calling signal to the last-mentioned access channel receiver if the detection output of said detecting means is not received within a first predetermined interval of time and, for generating a trouble signal if said detection output is not received within a second predetermined interval of time, after the transmission of said test calling signal, said second predetermined interval of time being shorter than said first predetermined interval of time.

2. A mobile radio telephone system, as claimed in claim 1, wherein said control means comprises:

timer circuit means for generating a first pulse signal if said detection output is not received within said first predetermined interval of time and, for generating a second pulse signal if said detection output is not generated within said second predetermined interval of time, after the transmission of said test calling signal;

generator means for generating said test calling signal in response to said first pulse signal;

transmitter means for transmitting said test calling signal from said generator means to said last-mentioned access channel receiver; and means for generating said trouble signal in response to said second pulse signal.

3. A mobile radio telephone system, as claimed in claim 2, wherein said detecting means includes a data receiver and said generator means includes a data generator.

4. A mobile radio telephone system, as claimed in claim 3, wherein said data receiver includes a tone detector and said data generator includes a tone generator.

5. A mobile radio telephone system, as claimed in claim 3, wherein said data receiver includes a digital pattern detector and said data generator includes a digital pattern generator.

6. A mobile radio telephone system, as claimed in claim 1, wherein said control means comprises timer circuit means for generating a first pulse signal if said detection output is not received within said first predetermined interval of time and, for generating a second pulse signal if said detection output is not received within said second predetermined interval of time, after the transmission of said test calling signal; transmitter means for transmitting, in response to said first pulse signal, the carrier of said access channel receiver to said last-mentioned access channel receiver; and means for generating said trouble signal in response to said second pulse signal.

7. A mobile radio telephone system, as claimed in claim 6, wherein said detecting means includes a noise/carrier detector for detecting one of the field strength of said carrier and the noise in the out-band of said carrier.

8. A mobile radio telephone system, as claimed in any one of claims 2 through 7, wherein said timer circuit means comprises:

capacitor means for storing an electric charge supplied from a constant current supplying source;

transistor means for receiving the output of said detecting means at a control terminal of said transistor means, and, being responsive to said detection output for discharging the electric charge stored in said capacitor means; and first and second voltage comparator means connected to the output of said capacitor means for voltage comparing the output of said capacitor means with first and second predetermined threshold levels, respectively and, for generating said first and second pulse signals when said output exceeds said first and second thresholds, respectively, said first predetermined threshold level being lower than said second predetermined threshold level.

* * * * *

UNITED STATES PATENT AND TRADEMARK OFFICE
CERTIFICATE OF CORRECTION

PATENT NO. : 4,443,661
DATED : April 17, 1984
INVENTOR(S) : Hiroshi KUBO

It is certified that error appears in the above-identified patent and that said Letters Patent is hereby corrected as shown below:

Column 7, line 7, after "mobile" change "station" to -- stations --.

Signed and Sealed this

Eighteenth Day of December 1984

[SEAL]

Attest:

Attesting Officer

GERALD J. MOSSINGHOFF

Commissioner of Patents and Trademarks